United States Patent
Park et al.

(10) Patent No.: US 8,913,124 B2
(45) Date of Patent: Dec. 16, 2014

(54) LOCK-IN IMAGING SYSTEM FOR DETECTING DISTURBANCES IN FLUID

(75) Inventors: Yeonjoon Park, Yorktown, VA (US);
Sang Hyouk Choi, Yorktown, VA (US);
Glen C. King, Williamsburg, VA (US);
James R. Elliott, Vesuvius, VA (US);
Albert L. Dimarcantonio,
Williamsburg, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 359 days.

(21) Appl. No.: 13/020,194

(22) Filed: Feb. 3, 2011

(65) Prior Publication Data
US 2012/0200696 A1    Aug. 9, 2012

(51) Int. Cl.
*H04N 7/18*      (2006.01)
*G01P 5/26*      (2006.01)
*G01P 5/00*      (2006.01)
*G01S 1/14*      (2006.01)
*G01S 17/95*     (2006.01)

(52) U.S. Cl.
CPC ... *G01P 5/26* (2013.01); *G01P 5/00* (2013.01); *G01S 1/14* (2013.01); *G01S 17/95* (2013.01)
USPC ............................................. 348/135

(58) Field of Classification Search
CPC combination set(s) only.
See application file for complete search history.

(56) References Cited

U.S. PATENT DOCUMENTS

| | | | | |
|---|---|---|---|---|
| 3,431,352 A | * | 3/1969 | Philbert | 348/135 |
| 3,448,613 A | * | 6/1969 | Kastner et al. | 73/170.16 |
| 3,825,346 A | * | 7/1974 | Rizzo | 356/28.5 |
| 4,359,640 A | * | 11/1982 | Geiger | 250/372 |
| 5,394,238 A | * | 2/1995 | Mocker et al. | 356/342 |
| 5,457,989 A | * | 10/1995 | Minoshima | 73/170.06 |
| 5,600,434 A | * | 2/1997 | Warm et al. | 356/139.08 |
| 6,154,174 A | * | 11/2000 | Snider et al. | 342/371 |
| 7,830,527 B2 | * | 11/2010 | Chen | 356/489 |
| 7,933,002 B2 | * | 4/2011 | Halldorsson | 356/28 |
| 8,339,583 B2 | * | 12/2012 | Tillotson | 356/28 |
| 2004/0100395 A1 | * | 5/2004 | Anderson | 340/945 |
| 2007/0139634 A1 | * | 6/2007 | Mulder | 355/67 |
| 2007/0171397 A1 | * | 7/2007 | Halldorsson et al. | 356/342 |
| 2011/0164783 A1 | * | 7/2011 | Hays et al. | 382/100 |

OTHER PUBLICATIONS

P. Y. Chuang, E. W. Saw, J. D. Small, R. A. Shaw, C. M. Sipperley, G. A. Payne & W. D. Bachalo, "Airborne Phase Doppler Interferometry for Cloud Microphysical Measurements" Aerosol Science and Technology, vol. 42, 2008, pp. 685-703.*

* cited by examiner

*Primary Examiner* — Dave Czekaj
*Assistant Examiner* — Tyler W Sullivan
(74) *Attorney, Agent, or Firm* — Jennifer L. Riley; Thomas K. McBride, Jr.

(57) ABSTRACT

A lock-in imaging system is configured for detecting a disturbance in air. The system includes an airplane, an interferometer, and a telescopic imaging camera. The airplane includes a fuselage and a pair of wings. The airplane is configured for flight in air. The interferometer is operatively disposed on the airplane and configured for producing an interference pattern by splitting a beam of light into two beams along two paths and recombining the two beams at a junction point in a front flight path of the airplane during flight. The telescopic imaging camera is configured for capturing an image of the beams at the junction point. The telescopic imaging camera is configured for detecting the disturbance in air in an optical path, based on an index of refraction of the image, as detected at the junction point.

20 Claims, 4 Drawing Sheets

LOCK-IN IMAGING SYSTEM FOR DETECTING DISTURBANCES IN FLUID

TECHNICAL FIELD

The present invention relates to a lock-in imaging system for detecting disturbances in fluid.

BACKGROUND OF THE INVENTION

Turbulence and vortices in the front flight path of an airplane may present problems, especially when the airplane is approaching an airfield to land. This is because the area near the airfield has a very low altitude and the vortices and turbulence near the ground may cause the airplane to become unstable. Therefore it is important to detect the presence of air turbulence and vortices in the front flight path of the airplane before the airplane enters the area of the air turbulence and vortices. However, the vortex and turbulence are just irregular motion of transparent air so that a visual detection is very difficult. A Doppler radar system can detect the motion of air and moisture in the far distance, but the system is very complex, expensive, and not effective in a close distance to determine the presence of air turbulence and vortices. Common light detection and ranging (LIDAR) systems that are configured to detect a chemical signature of aerosols and gases in the air are not effective because the turbulence and vortices often have the same chemical composition as steady air that is free of turbulence and vortices. While doppler LIDAR can measure an averaged Turbulence Energy Dissipation Rate (TEDR) and an integral scale of turbulence, the Doppler LIDAR method is not effective to detect wind that is perpendicular to the measurement direction because the Doppler LIDAR detects a frequency shift of the wind toward or away from the detector. Also, the sensitivity and the signal to noise ratio of the Doppler LIDAR are low and need to be improved. The visual mapping of turbulence and vortices is very difficult with the Doppler LIDAR. So far, most of the visual information of vortices and turbulence has been obtained through this method by adding additional smoke to visualize the motion of air. However, the introduction of smoke is not practical for use when flying the airplane.

SUMMARY OF THE INVENTION

A lock-in imaging system is configured for detecting disturbances in fluids. The system includes an interferometer and a telescopic imaging camera. The interferometer is configured for producing an interference pattern by splitting a coherent beam of light into two coherent beams along two paths and recombining the two beams at a junction point. The telescopic imaging camera is configured for capturing an image of the two coherent beams at the junction point. The telescopic imaging camera is configured for detecting the disturbance of the fluid in an optical path of the two coherent beams based on an index of refraction of the image detected at the junction point.

A lock-in imaging method of detecting disturbances in fluids includes producing an interference pattern at a junction point with an interferometer by splitting a beam of coherent light into two coherent beams along two paths and recombining the two coherent beams at the junction point. The image of the two coherent beams is captured at the junction point with a telescopic imaging camera. The disturbance of the fluid is detected in an optical path of the two coherent beams based on an index of refraction of the image captured by the telescopic imaging camera at the junction point.

In one embodiment, an aircraft system is configured for detecting disturbances in air. The aircraft system includes an airplane and a lock-in imaging system. The airplane includes a fuselage and a pair of wings. The airplane is configured for flight in air. The lock-in imaging system includes an interferometer and a telescopic imaging camera. The interferometer is operatively disposed on the airplane and configured for producing an interference pattern by splitting a coherent beam of light into two coherent beams along two paths and recombining the two coherent beams at a junction point in a front flight path of the airplane during flight. The telescopic imaging camera is configured for capturing an image of the beams at the junction point. The telescopic imaging camera is configured for detecting the disturbance in air in an optical path of the two coherent beams based on an index of refraction of the image detected at the junction point.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
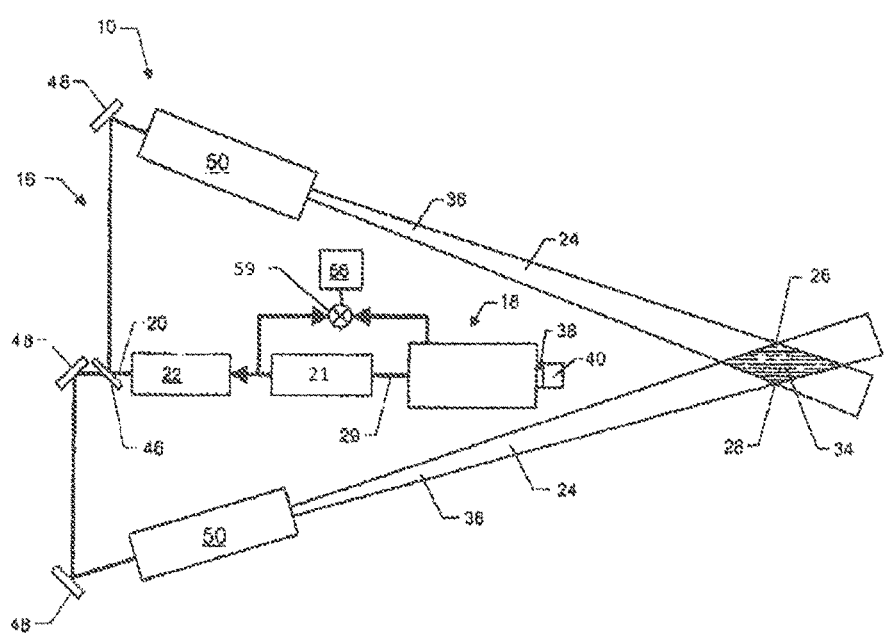
FIG. 1 is a schematic view of a lock-in imaging system for detecting disturbances in fluid along an optical path of two coherent beams at a junction point.
Figure 2A:
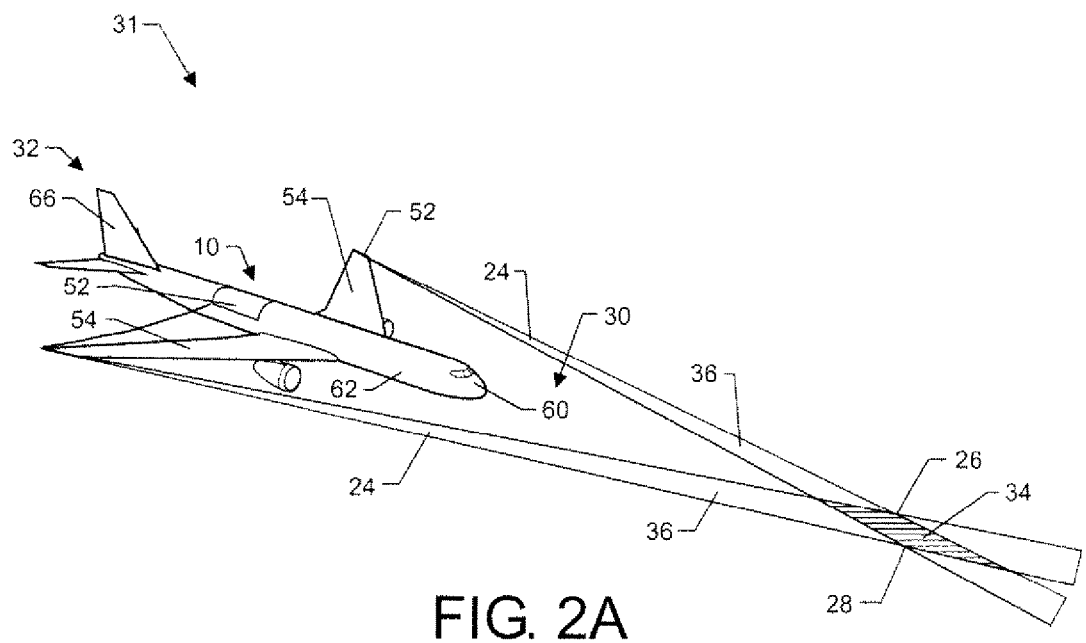
FIG. 2A is a schematic perspective view of the lock-in imaging system of FIG. 1 operatively attached to an airplane with no disturbance in an optical path detected at the junction point of the two coherent beams.
Figure 2B:
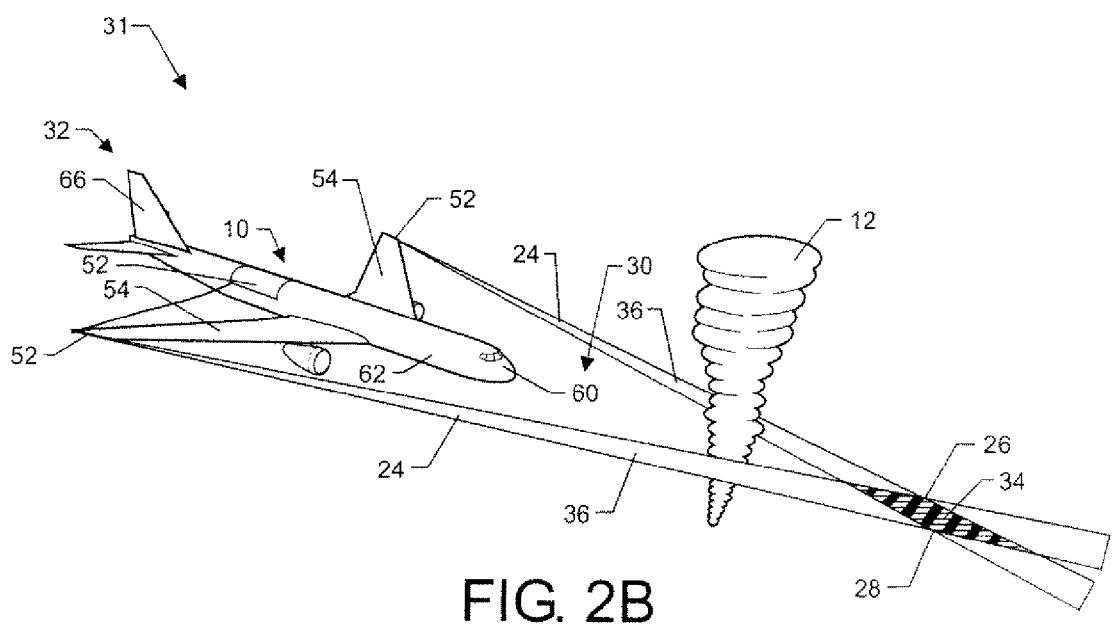
FIG. 2B is a schematic perspective view of the lock-in imaging system of FIG. 1 operatively attached to the airplane with a disturbance in the optical path detected at the junction point of the two coherent beams.

Referring to the drawings, wherein like reference numbers refer to like components, FIG. 1 shows a lock-in imaging system 10. Referring to FIGS. 2A and 2B, the lock-in imaging system 10 is configured for detecting disturbances 12 in fluids, such as air or liquid. The disturbances 12 may be turbulence, vortices, and the like. The lock-in imaging system 10 includes an interferometer 16 and a telescopic imaging camera 18. The interferometer 16 is configured to produce an interference fringe pattern 34 by splitting a beam of coherent light 20 produced from a coherent light source 22 into two coherent beams 36 that travel along two respective optical paths 24 and recombining the beams at a junction point 26. The telescopic imaging camera 18 is configured to capture the image 28 of the beams at the junction point 26. The interferometer 16 and the telescopic imaging camera 18 will be described in more detail below.

Figure 3:
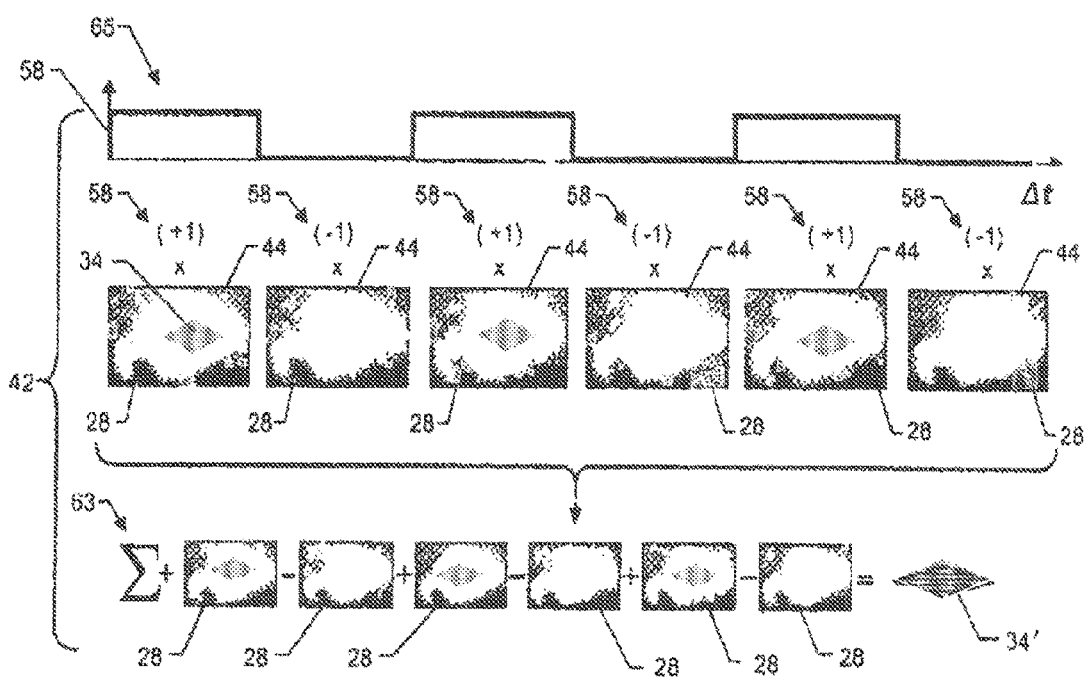
FIG. 3 is a schematic view a lock-in imaging method for detecting disturbances in fluid along the optical path of the two coherent beams at the junction point.

As shown in FIGS. 1, 2A, and 2B, the lock-in imaging system 10 is configured to detect the presence of turbulence and/or vortices in the near-distance front flight path 30 of an airplane 32. The lock-in imaging system 10 provides a lock-in imaging method 42, which method 42 is depicted in FIG. 3. More specifically, the lock-in imaging system 10 is configured to detect irregular motion of transparent air, i.e., turbulence, vortices, and the like, in the front flight path 30 of the airplane 32 from between about a hundred meters to greater than one kilometer. Further, as will be described in more detail below, FIG. 2A shows an interference fringe pattern 34 made by normal air and FIG. 2B shows a new interference fringe pattern 34 that appears when clear air turbulence or a vortex enters an optical path 24 in the front flight path 30 of the airplane 32.

Although vortices and turbulence are transparent air, vortices and turbulence have a slightly different index of refraction from that of steady, normal air. This difference in the index of refraction is due to a difference in a local pressure and density of the air having the vortices or turbulence, when compared with the steady, normal air. When a coherent light, such as a laser (Light Amplification by the Stimulated Emission of Radiation), maser (Microwave Amplification by the Stimulated Emission of Radiation), and the like, is split into two coherent beams 36 to travel in two different optical paths 24 and the two coherent beams 36 combine again at the junction point 26, the coherent light has a complex interference fringe pattern 34 at the junction point 26. This complex pattern can be seen if a screen is inserted at the junction point 26. When air turbulence or vortices are disposed in the optical path 24 of the two coherent beams 36, the interference fringe pattern 34 may change, as observed at the junction point 26.

In the sky, while there is no solid screen or other reflective surface, there is a scattering process that is produced by small dielectric particles, such as moisture, dust, and gas molecules. This phenomena is called the Rayleigh scattering process where the characteristic size of a scattering dielectric particle is $x=(2\pi\alpha)/\lambda$ with a radius $\alpha$, is so small that $x \ll 1$. The intensity of light scattered by a small particle from unpolarized light is proportional to the differential cross section, $$I(\theta) \propto \frac{d\sigma}{d\Omega} = \left(\frac{2\pi}{\lambda}\right)^4 \cdot \alpha^6 \cdot \left|\frac{\varepsilon_r - 1}{\varepsilon_r + 2}\right|^2 \cdot \frac{(1 + \cos^2\theta)}{2} \quad \text{(Eq. 1)}$$

where $\varepsilon_r$ is the dielectric constant, $\theta$ is the scattering angle, and $\alpha$ is the radius of a dielectric particle. The scattering intensity is strong when $\theta=0°$ (forward scattering) and $\theta=180°$ (back scattering). This means the if two almost-parallel coherent beams cross each other with a small intersecting angle, the back scattering of interference fringes can be measured with a lock-in imaging system 10. The interference fringe pattern 34 is affected by the refractive index of the air in the optical path 24. When an irregular turbulence or vortex occurs in the air, they have slightly different indices of refraction as that of normal, steady air because of the change in the density, pressure, and velocity of the air. Therefore even though clear air turbulence and vortices are transparent, the resulting interference patterns are different from that of normal air. The wavelength of the coherent light source 22 can be chosen to allow weak scattering in the air with some moisture such that the back scattering at the interference junction can be detected. The interference pattern of Laser Induced Fluorescence (LIF) of gas molecules and moistures can be used as well. During LIF, energy is absorbed into molecules such that the molecules are excited. When the excited molecules return to the ground state, energy is released in the form of fluorescence. The amount of fluorescence released is an indication of the amount of molecules that are present in the fluid. This is an indication of a geometric profile of the fluid, i.e., vortex, turbulence, or steady, normal air).

Referring again to FIG. 1, the back scattered interference fringe pattern 34 generally provides a very weak light signal when the light signal is compared with sun light or other background scenery. Optical filters 38, such as a band-pass filter 38 which is tuned for a laser, a maser, or a LIF wavelength can be mounted on the telescopic imaging camera 18 to filter 38 out the background scenery. A zoom lens 40 may also be mounted to the telescopic imaging camera 18 to magnify the image 28 of the interference fringe pattern 34. Also, referring to FIG. 3, in order to amplify the weak fringe interference pattern 34 and further cancel out the background scenery, a lock-in imaging method 42 can be used. The lock-in imaging method 42 is of the type known to those skilled in the art which uses a modulated source's phase information, i.e., a phase signal 58, in FIG. 3 is inserted to a signal mixer 59 to a multiply a weighting factor (+/−1) to sequential image frames 44. The frames 44 are summed over a short period of time $\Delta t$ to obtain image 34'. Referring back to FIG. 1, an external clock or an image phase frequency divider 21 that provides an electric connection 29 with a vertical sync from the camera 18, can be used as a modulation phase source.

Referring again to FIG. 1, a diagram of the lock-in imaging system 10 using the modulated laser (or the maser) is shown. The lock-in imaging system 10 includes the interferometer 16 and the telescopic imaging camera 18. The interferometer 16 includes the coherent light source 22, i.e., the modulated laser (or the maser), a beam splitter 46, a plurality of mirrors 48, and a pair of beam expanders 50 with divergence controls. The beam splitter 46 splits one coherent beam 20 into the two coherent beams 36. The two coherent beams 36 eventually remerge at the junction point 26 to detect the changes to the interference fringe pattern 34. The beam splitter 46 directs the pair of coherent beams 36 in different directions and into a respective one of the mirrors 48. The mirrors 48 are configured to direct the pair of coherent beams 36 toward one another such that the two coherent beams 36 intersect at the junction point 26. Prior to the pair of coherent beams 36 intersecting at the junction point 26, each of the pair of coherent beams 36 is directed through the beam expander 50. In the embodiment shown in FIGS. 2A and 2B, at least one mirror 48 is disposed at a tip 52 of a respective wing 54 of the airplane 32. The beam expander 50 is configured to expand each beam of the pair of coherent beams 36 to the size of a desired cross-section at the junction point 26. The optical path 24 is disposed along the two coherent beams 36, between the junction point 26 and the beam expanders 50. The interferometer 16 may also include a processor 56 that is in operative communication with the coherent light source 22 and the telescopic imaging camera 18. The processor 56 is configured for analyzing the images 28 of the pair of coherent beams 36 at the junction point 26 as a function of a phase signal 58.

The telescopic imaging camera 18 shown in FIG. 1 is configured to capture a plurality of frames 44 per second and provides the phase signal 58 as shown in FIG. 3, which comes from the electric connection 29 shown in FIG. 1. The telescopic imaging camera 18 may be generally disposed proximate a front 60 of a fuselage 62 of the airplane 32 such that the filter 38 and zoom lens 40 are generally centered between the two coherent beams 36. When the telescopic imaging camera 18 is disposed in the generally central location, the zoom lens 40 and the filter 38 are in position to view the cross-section of the interference fringe pattern 34 at the junction point 26. The phase signal 58 from the telescopic imaging camera 18 is divided into digital pulses of ON an OFF states in order to take at least one image 28 with the laser or the maser (i.e., an ON state) and take at least one other image 28 without the laser or the maser (i.e., an OFF state). A modulation of the laser or the maser is performed by the phase signal 58 at a divided frequency. The modulation of the laser or maser is illustrated at 65 in FIG. 3 over the period of time Δt. The images 28 acquired by the telescopic imaging camera 18 are computed with the phase signal 58 and summed 63 over the short period of time Δt using alternating weighting factors. For example, a lock-in imaging method 42 is illustrated in FIG. 3. When the laser or maser is on, the value of (+1) is multiplied by a numerical data of the image frame 44, and when the laser or maser is off, the value of (−1) is multiplied by the numerical data of the image frame 44. When all images 28 frames 44 are summed, only modulated interference fringe patterns 34 of the same frequency are amplified and the background images 28 are cancelled out.

Summation 63 of the image frames 44 using only the alternating weighting factors cancels out the background scenery and also amplifies any phase-locked interference fringe patterns 34. Lock-in imaging methods 42 have been proposed in many other applications. More specifically, the lock-in imaging methods 42 have showed very good results in microscopic thermal imaging systems. Additionally, the lock-in imaging methods 42 may be used to detect weather phenomenon, such as tornados. It should also be appreciated that the lock-in imaging system 10 is not limited to being used to measure the interference fringe patterns 34 of air, but may be used with any fluids, such as liquids and the like.

Figure 4:
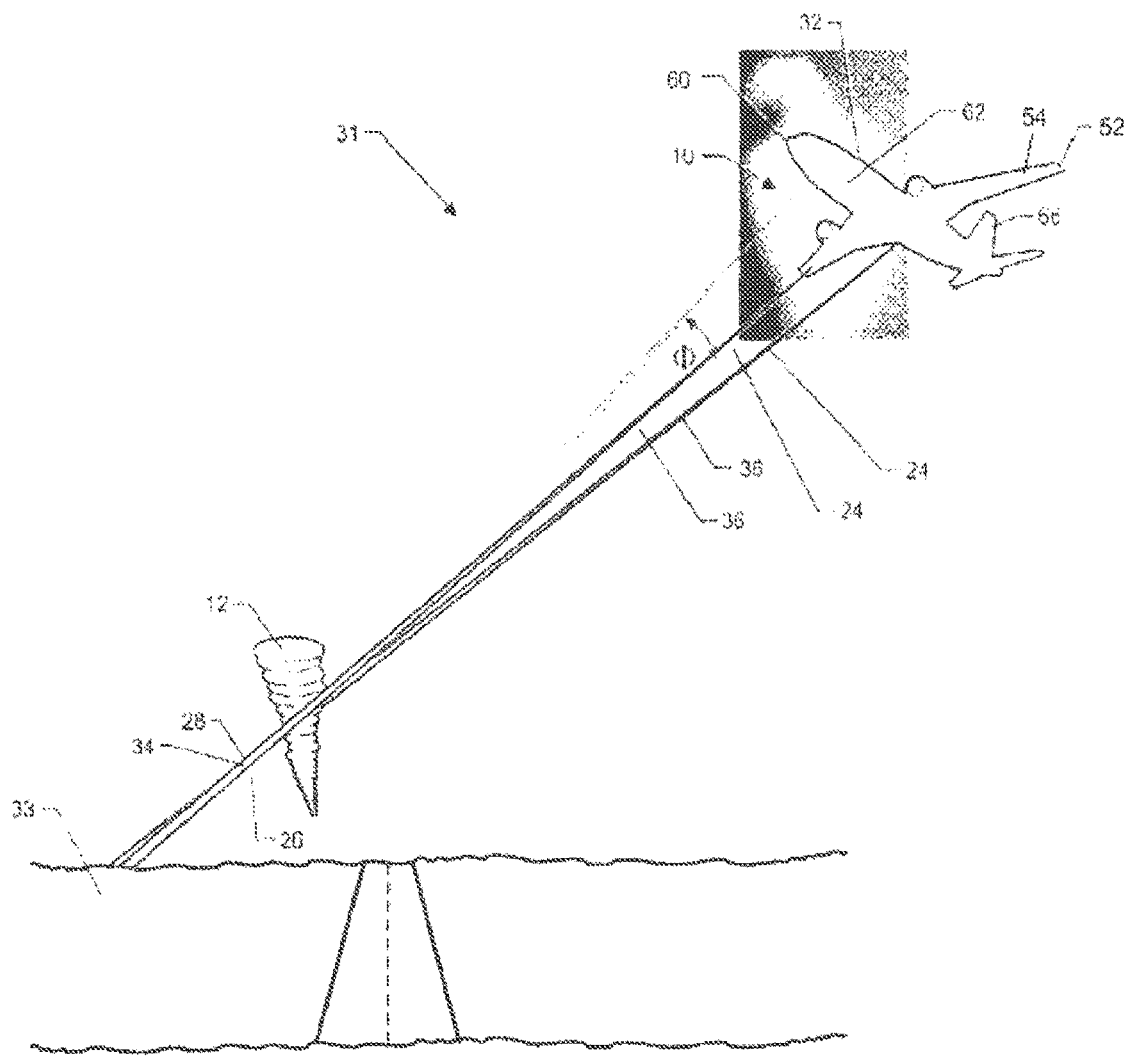
FIG. 4 is a schematic perspective view of an aircraft system with an airplane having the lock-in imaging system of FIG. 1 detecting disturbances of fluid along the optical path at the junction point while approaching an airfield to land.

Referring to FIG. 4, in practical applications, it may be desired to monitor the air at a slightly lower altitude with an aircraft system 31. The aircraft system 31 includes an airplane 32 with the lock-in imaging system 10 operatively connected thereto. When the airplane 32 approaches an airfield 33, the airplane 32 will descend into the area being monitored during landing. To do this, the pair of coherent beams 36, and the corresponding junction point 26, may be configured to deviate from a horizontal plane of the airplane 32 and the telescopic imaging camera 18 may view the interference fringe pattern 34 with an angle ϕ. Actually, it may be advantageous to provide the lock-in imaging system 10 with an angle ϕ that is defined between a plane of the two coherent beams and the telescopic imaging camera 18 to allow the observation of a full interference fringe pattern 34 area by the telescopic imaging camera 18. Therefore, alternative mounting points of the lock-in imaging system 10 can be considered. For example, the telescopic imaging camera 18 can be mounted at a tip 52 of a vertical fin 66 instead of the front of the fuselage of the airplane 32. It should be appreciated that other mounting locations known to those skilled in the art may also be used. Because mechanical vibration can change interferometeric interference fringe patterns 34, a stable, clear optical path 24 for the two coherent beams is required. Also the lock-in imaging system 10 needs to be mounted on a stable platform. This means that if the sources of coherent beams, e.g., mirrors 48 and the like, are mounted at tips 52 of the flexible wings 54 of the airplane 32, a dynamic compensation of wave front and phase is required. Alternatively, a compact lock-in imaging system 10 with small a distance between the two coherent beams 36 can be mounted on a stable optical table inside the fuselage without a mechanical vibration problem.

Referring to FIG. 3, the integrated lock-in imaging method 42 cancels out the background images such as ground sceneries and cloud sceneries. However, when the ground is near, the image 28 can shift a little bit from one frame 44 to another frame 44 because of the fast speed of the airplane 32. To overcome this, a separate image 28 drift compensation algorithm with the velocity information of the airplane 32 can be used in the lock-in image 28 calculation computer and electronics.

A high speed digital speckle pattern interferometry that scans a narrow region of interest (ROI) can be used with the lock-in imaging method 42 and modulated coherent light sources 22. For example, CMOS image 28 sensors can provide very high frame 44 rate of ROI such as 128×128 pixels at 900 Hz or 64×8 pixels at 16.8 KHz.

Finally, a point detector or one-dimensional (1D) array detector can be used instead of a two-dimensional (2D) imaging detector if the interference fringe pattern 34 can generate a moderately large stable spot. While the 2D imaging detector with a lock-in method can analyze the full pattern of the fringes, the 2D imaging detector requires a pattern recognition calculation to detect the change of interference fringe patterns 34 due to the clear air turbulence and vortex. If a wave front of two coherent beams 36 is pre-adjusted to generate a large constructive (or destructive) interference spot, a simple point detector or 1D imaging array can be used to monitor a change of the intensity of the constructive (or destructive) interference spot. In this case, the calculation to detect the change of the interference fringe patterns 34 can be simplified and the lock-in modulation frequency can be increased by a few orders of magnitude.

The above described system can be mounted on the ground station near the airfield in order to monitor the turbulence and vortex at the landing site.

While the best modes for carrying out the invention have been described in detail, those familiar with the art to which this invention relates will recognize various alternative designs and embodiments for practicing the invention within the scope of the appended claims.

The invention claimed is:

1. A lock-in imaging system configured for detecting disturbances in fluids including air, the system comprising:
an interferometer located on an aircraft configured for producing an interference pattern by splitting a coherent beam of light into two coherent beams along two paths and recombining the two coherent beams at a junction point in front of a flight path;
a plurality of mirrors configured for directing the two coherent beams toward one another at the junction point; and
a telescopic imaging camera located on the aircraft configured for capturing an image of the interference pattern of the two coherent beams at the junction point where the two coherent beams of light recombine in front of the flight path;
wherein at least one of the plurality of mirrors is disposed on a tip of a pair of wing, from a pair of wines of the aircraft,
wherein the telescopic imaging camera is configured for detecting the disturbance of the fluid along an optical path of the two coherent beams based on an index of refraction of the image detected at the junction point in front of the flight path, and wherein the telescopic imaging camera is configured for detecting the disturbance of the fluid along the optical path of the two coherent beams based on a pressure dependent change of the index of refraction of the air.

2. A system, as set forth in claim 1, wherein the telescopic imaging camera includes an optical filter configured to filter out background scenery.

3. A system, as set forth in claim 1, wherein the telescopic imaging camera is configured for capturing a plurality of frame images per second and for producing a phase signal in at least one of an on state and an off state.

4. A system, as set forth in claim 3, wherein the system is configured such that the phase signal from the telescopic imaging camera is divided by a frequency divider to capture at least one image in the on state and to capture at least one other image in the off state.

5. A system, as set forth in claim 2, wherein the optical filter is one of a band-pass filter and a laser induced fluorescence filter.

6. A system, as set forth in claim 4, wherein the interferometer includes:
   a coherent light source configured for emitting a coherent beam of light;
   a beam splitter configured for splitting the coherent beam of light into two coherent beams; and
   a plurality of mirrors configured for directing the two coherent beams toward one another at the junction point.

7. A system, as set forth in claim 6, wherein the coherent light source is one of a laser and a maser.

8. A system, as set forth in claim 6, wherein the interferometer further includes a pair of beam expanders and divergence controls,
   wherein each of the pair of beam expanders and divergence controls are operatively disposed between one of the plurality of mirrors and the junction point such that each of the two coherent beams is directed through a respective one of the pair of beam expanders and divergence controls to expand each of the two coherent beams to a desired cross-section at the junction point.

9. A system, as set forth in claim 6, wherein the coherent light source is configured to produce the phase signal in response to emitting the beam of coherent light.

10. A system, as set forth in claim 9, wherein the system further includes a processor in operative communication with the coherent light source and the telescopic imaging camera, wherein the processor is configured for analyzing the images of the pair of beams at the junction point as a function of the phase signal.

11. A lock-in imaging method of detecting disturbances in fluids including air, the method comprising:
   producing an interference fringe pattern at a junction point in front of a flight path with an interferometer located on an aircraft by splitting a beam of coherent light into two coherent beams along two paths and recombining the two coherent beams at the junction point in front of a flight path using a plurality of mirrors, at least one of which is disposed on a tip of a wing, from a pair of wings of the aircraft;
   capturing an image of the interference pattern of the two coherent beams at the junction point in front of a flight path with a telescopic imaging camera located on the aircraft; and
   detecting the disturbance of the fluid in an optical path of the two coherent beams based on an index of refraction of the image captured by the telescopic imaging camera at the junction point in front of the flight path, and wherein the telescopic imaging camera is configured for detecting the disturbance of the fluid along the optical path of the two coherent beams based on a pressure dependent change of the index of refraction of the air.

12. A method, as set forth in claim 11, further comprising producing a phase signal in at least one of an on state and an off state such that the phase signal from the telescopic imaging camera is divided by a frequency divider to capture at least one image frame in the on state and to capture at least one other image frame in the off state.

13. A method, as set forth in claim 12, further comprising summing the image frames over a period of time using a modulated sources phase signal to multiply a weighting factor to sequential image frames to cancel out background scenery and amplify phase-locked fringe patterns.

14. A method, as set forth in claim 11, wherein producing the interference fringe pattern at the junction point with the interferometer includes:
   emitting the coherent beam of light from a coherent light source;
   splitting the coherent beam of light into a pair of coherent beams of light; and
   directing the pair of coherent beams of light toward one another at the junction point.

15. A method, as set forth in claim 14, further comprising expanding each of the two coherent beams of light to a desired cross-section at the junction point.

16. A method, as set forth in claim 15, further comprising producing a phase signal in response to emitting the coherent beam of light from the coherent light source.

17. A method, as set forth in claim 16, analyzing the images of the two coherent beams at the junction point as a function of the phase signal with a processor.

18. A system configured for detecting a disturbance in air, the system comprising:
   an airplane having a fuselage and a pair of wings, wherein the airplane is configured for flight in air;
   an interferometer operatively disposed on the airplane and configured for producing an interference pattern by splitting a coherent beam of light into two coherent beams along two paths and recombining the two coherent beams at a junction point in front of a flight path of the airplane during flight;
   a plurality of mirrors configured for directing the two coherent beams towards one another at the junction point; and
   a telescopic imaging camera located on the airplane configured for capturing an image of the interference pattern of the two coherent beams at the junction point in front of the flight path;
   wherein at least one of the plurality of mirrors is disposed on a tip of each of the wings,
   wherein the telescopic imaging camera is configured for detecting the disturbance in air along an optical path of the two coherent beams based on an index of refraction of the image detected at the junction point in front of the flight path, and wherein the telescopic imaging camera is configured for detecting the disturbance of the fluid along the optical path of the two coherent beams based on a pressure dependent change of the index of refraction of the air.

19. A system, as set forth in claim 18, wherein the telescopic imaging camera is configured for capturing a plurality of frame images per second and for producing a phase signal in at least one of an on state and an off state; and
   wherein the system is configured such that the phase signal from the telescopic imaging camera is divided by a frequency divider to capture at least one image in the on state and to capture at least one other image in the off state.

20. A system configured for detecting a disturbance in air, the system comprising:
   an airplane having a fuselage and a pair of wings, wherein the airplane is configured for flight in air;
   an interferometer operatively disposed on the airplane and configured for producing an interference pattern by splitting a coherent beam of light into two coherent beams along two paths and recombining the two coherent beams at a junction point in front of a flight path of the airplane during flight; and a telescopic imaging camera located on the airplane configured for capturing an image of the interference pattern of the two coherent beams at the junction point in front of the flight path;

wherein the telescopic imaging camera is configured for detecting the disturbance in air along an optical path of the two coherent beams based on an index of refraction of the image detected at the junction point in front of the flight path, wherein the interferometer includes:

a coherent light source operatively disposed on the fuselage of the airplane and configured for emitting the coherent beam of light;

a beam splitter operatively disposed on the fuselage of the airplane and configured for splitting the coherent beam of light into the two coherent beams; and a plurality of mirrors configured for directing the two coherent beams of light toward one another at the junction point;

wherein at least one of the plurality of mirrors are disposed on a tip of each of the wings.

* * * * *